United States Patent [19]
Eckert et al.

[11] Patent Number: 5,499,356
[45] Date of Patent: Mar. 12, 1996

[54] METHOD AND APPARATUS FOR A MULTIPROCESSOR RESOURCE LOCKOUT INSTRUCTION

[75] Inventors: Roger E. Eckert, Eau Claire; Richard E. Hessel, Altoona; Andrew E. Phelps, Eau Claire; George A. Spix, Eau Claire; Jimmie R. Wilson, Eau Claire, all of Wis.

[73] Assignee: Cray Research, Inc., Chippewa Falls, Wis.

[21] Appl. No.: 173,923

[22] Filed: Dec. 28, 1993

Related U.S. Application Data

[63] Continuation of Ser. No. 920,155, Jul. 23, 1992, abandoned, which is a continuation of Ser. No. 536,217, Jun. 11, 1990, abandoned, which is a continuation-in-part of Ser. No. 459,083, Dec. 29, 1989, Pat. No. 5,197,130.

[51] Int. Cl.⁶ ..................................................... G06F 12/14
[52] U.S. Cl. ........................... 395/479; 395/482; 395/490
[58] Field of Search .................................. 395/400, 425, 395/474, 479, 481, 482, 490

[56] References Cited

U.S. PATENT DOCUMENTS

| | | | |
|---|---|---|---|
| 3,573,736 | 4/1971 | Schlaeppi | 364/200 |
| 4,038,645 | 7/1977 | Birney et al. | 364/DIG. 1 |
| 4,123,795 | 10/1978 | Dean, Jr. et al. | 364/200 |
| 4,399,504 | 8/1983 | Obermarck et al. | 364/200 |
| 4,574,350 | 3/1986 | Starr | 364/200 |
| 4,587,609 | 5/1986 | Boudreau et al. | 364/200 |
| 4,604,694 | 8/1986 | Hough | 364/200 |
| 4,663,709 | 5/1987 | Fujiwara et al. | 364/200 |
| 4,794,516 | 12/1988 | Auerbach et al. | 364/200 |
| 4,802,089 | 1/1989 | Shaw | 364/200 |
| 4,837,676 | 6/1989 | Rosman | 364/200 |
| 4,847,754 | 7/1989 | Obermarck et al. | 364/200 |
| 4,949,239 | 8/1990 | Gillett, Jr. et al. | 364/DIG. 1 |
| 4,975,870 | 12/1990 | Knicely et al. | 364/DIG. 2 |
| 5,063,504 | 11/1991 | Jordan, Jr. | 395/725 |
| 5,115,499 | 5/1992 | Stiffler et al. | 395/425 |

OTHER PUBLICATIONS

IBM Tech. Disc. Bull., vol. 18, No. 5, Oct. 1975, "Shared Locking without a Lock", M. Taradalsky, pp. 1545–1546.
Hwang & Briggs, Computer Architecture and Parallel Processing, pp. 557–565, 1984.

*Primary Examiner*—David L. Robertson
*Attorney, Agent, or Firm*—Schwegman, Lundberg & Woessner

[57] ABSTRACT

A method and apparatus for providing a resource lockout mechanism in a shared memory, multiprocessor system that is capable of performing both a read and write operation during the same memory operation. The load and flag instruction of the present invention can execute a read operation, followed by a write operation of a preselected flag value to the same memory location during the same memory operation. The load and flag instruction is particularly useful as a resource lockout mechanism for use in Monte Carlo applications.

7 Claims, 2 Drawing Sheets

Fig. 2

MEMORY COMMAND OPERATIONS
(PERFORMED BY BANK CYCLE CONTROL)

LOAD:
- BANK n CMD — 10
- BANK n ADDR
- BANK n LOAD DATA
- BANK n WR ENABLE
- BANK n BUSY

STORE:
- BANK n CMD — 01
- BANK n ADDR
- BANK n STORE DATA
- BANK n WR ENABLE
- BANK n BUSY

LOADF: (ATOMIC LOAD/STORE OPERATION PERFORMED AT MEMORY BANK)
- BANK n CMD — 11
- BANK n ADDR
- BANK n STORE DATA — FLAG VALUE=FLOATING POINT NaN (SIGNALLING)
- BANK n LOAD DATA
- BANK n WR ENABLE — DELAYED WRITE ENABLE
- BANK n BUSY

METHOD AND APPARATUS FOR A MULTIPROCESSOR RESOURCE LOCKOUT INSTRUCTION

RELATED APPLICATIONS

This application is a continuation of application Ser. No. 07/920,155 filed Jul. 23, 1992, now abandoned, which is a continuation of application Ser. No. 07/536,217 filed Jun. 11, 1990, now abandoned, which is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, U.S. Pat. No. 5,197,130, issued Mar. 23, 1993 to Chen et al. which is assigned to the assignee of the present invention, a copy of which is attached hereto as an appendix, and which is hereby incorporated by reference in the present application. This application is also related to co-pending applications filed in the United States Patent and Trademark Office concurrently herewith, entitled SCALAR/VECTOR PROCESSOR, U.S. Pat. No. 5,430,884, issued Jul. 4, 1995 to Beard et al. and METHOD AND APPARATUS FOR NON-SEQUENTIAL RESOURCE ACCESS, U.S. Pat. No. 5,208,914 issued May 4, 1993 to Wilson, et al. both of which are assigned to the assignee of the present invention, a copy of each of which is attached hereto as an appendix, and which is hereby incorporated by reference in the present application.

TECHNICAL FIELD

This invention relates generally to the field of memory systems and memory management for computer and electronic logic systems. More particularly, the present invention relates to a method and apparatus for providing a resource lockout mechanism through execution of a load and flag instruction on a memory location. The resource lockout is accomplished by performing both a read and write operation to the same memory location during the same memory operating cycle.

BACKGROUND ART

The parent application identified above describes a new cluster architecture for high-speed computer processing systems, referred to as supercomputers. For most supercomputer applications, the objective is to provide a computer processing system with the fastest processing speed and the greatest processing flexibility, i.e., the ability to process a large variety of traditional application programs. In an effort to increase the processing speed and flexibility of supercomputers, the cluster architecture for highly parallel multiprocessors described in the previously identified parent application provides an architecture for supercomputers wherein a multiple number of processors and external interface means can make multiple and simultaneous requests to a common set of shared hardware resources, such as main memory, secondary memory, global registers, interrupt mechanisms, or other shared resources present in the system.

One of the important considerations in designing such shared resource multiprocessor systems, is how to indicate that a particular resource is presently being used by one of the processors and to provide a resource lockout mechanism so that another processor does not simultaneously use the same resource. The problem of resource lockout is further compounded by two additional factors associated with the cluster architecture for highly parallel multiprocessors that is described in the parent application identified above. First, the resource lockout mechanism must not only work with the registers and interrupt hardware for the system, it must also work on all of the locations of main memory. Second, the resource lockout mechanism must operate in a distributed environment where there is no central scheduler and where requestors other than processors (e.g., a distributed I/O controller) are also allowed direct access to shared resources without processor Intervention.

In essence, the problem of resource lockout has been managed in prior art supercomputers by assigning a single, central scheduling processor to keep track of what resources are currently being used by which processor. In a distributed access architecture, access to all shared resources is equal and democratic and there is no central scheduler. Hence, each requestor to a common shared resource must be provided with the information necessary to determine whether that resource is presently being used by another requestor in the multiprocessor system.

Present methods and systems for resource lockout mechanism for use in a shared memory, multiprocessor environment do not allow for fully distributed and democratic access to the common shared main memory by all of the possible requestors in the multiprocessor environment. Consequently, a new method and apparatus is needed that provides for an indication to all other requestors in the system when a particular shared resource is being utilized. In addition, a new method and apparatus is needed for requestors to manage their own requests for shared resource access, responsive to an indication that a resource is or is not available.

SUMMARY OF THE INVENTION

The present invention is a method and apparatus for providing a resource lockout mechanism in a shared resource, multiple requestor system that is capable of performing both a read and write function during the same resource operation. The present invention comprises a load and flag instruction that can execute a read operation, immediately followed by a write operation of a preselected flag value to the same resource location during the same resource operating cycle. The preselected flag value is one that is recognized by the requestors as not being valid data, thus indicating to the requestor that the resource they attempted to read from is locked. Unlike prior art resource lockout mechanisms, the present invention can operate on every memory location in main memory in a multiprocessor or a distributed I/O environment that has fully distributed and democratic access to all shared resources by all possible requestors.

In a preferred embodiment, the load and flag instruction is initiated by presenting both an address to a targeted memory location in a memory bank, along with a delayed write pulse. The write pulse is delayed just long enough to allow the data to be read from the targeted memory location, after which the write pulse overwrites a preselected flag value into the targeted memory location. The memory bank of the present invention is provided with both load data and store data ports that allow a given operation access to read and write data paths to memory locations in the memory bank respectively. During the load and flag operation, the preselected flag value is placed on the store data port and the data value in the targeted memory location is accessed in the memory bank and placed onto the load port. By controlling the timing signals that are being presented to the memory by the bank cycle control logic, the load and flag instruction is completed during a single memory operation, thereby making the present invention an atomic operation, i.e., an operation that is an uninterruptable one-step process.

One of the more useful applications of the present invention is as a resource lockout mechanism for use in Monte Carlo applications. The term Monte Carlo refers to the random nature of the requested memory addresses created by certain applications as the application attempts to update various memory locations determined by pseudo-random techniques.

In the preferred embodiment, the preselected flag value is chosen to be a floating point not-a-number (NAN) value. As the NaN value is not a valid number for purposes of the Monte Carlo application, the various processors in a multi-processor or distributed I/O system running a Monte Carlo application can quickly and easily determine whether any given random memory access has encountered a memory location that is subject to resource lockout because another requestor is presently updating that memory location. Because Monte Carlo operations are most efficiently performed as a pipeline or vector operation, the present invention allows the processor to continue processing in a pipelined fashion without interrupting the Monte Carlo process because a resource lockout was encountered. Instead, the processor notes the flagged location and returns to request that memory location again at a later time.

An objective of the present invention is to provide a method and apparatus for a resource lockout mechanism in a shared resource, multiple requestor system that is capable of performing both a read function and a write function as a single operation.

Another objective of the present invention is to provide a resource lockout mechanism that can operate on every memory location in main memory in a multiprocessor or distributed I/O environment that has fully distributed and democratic access to all shared resources by all possible requestors.

A further objective of the present invention is to provide a load and flag instruction that can execute a read operation, followed by a write operation of a preselected flag value to the same memory location as an atomic memory operation.

Still another objective of the present invention is to provide a resource lockout mechanism that can effectively indicate memory lockout conditions for a multiprocessor Monte Carlo application in such a way as to allow continued pipelined processing of the Monte Carlo application.

These and other objectives of the present invention will become apparent with reference to the drawings, the detailed description of the preferred embodiment and the appended claims.

DESCRIPTION OF THE DRAWINGS

FIG. 2 is a timing diagram for the load, store, and load and flag (loadf) instructions as executed in the multiprocessor memory system of FIG. 1.

DESCRIPTION OF THE PREFERRED EMBODIMENTS

Figure 1:
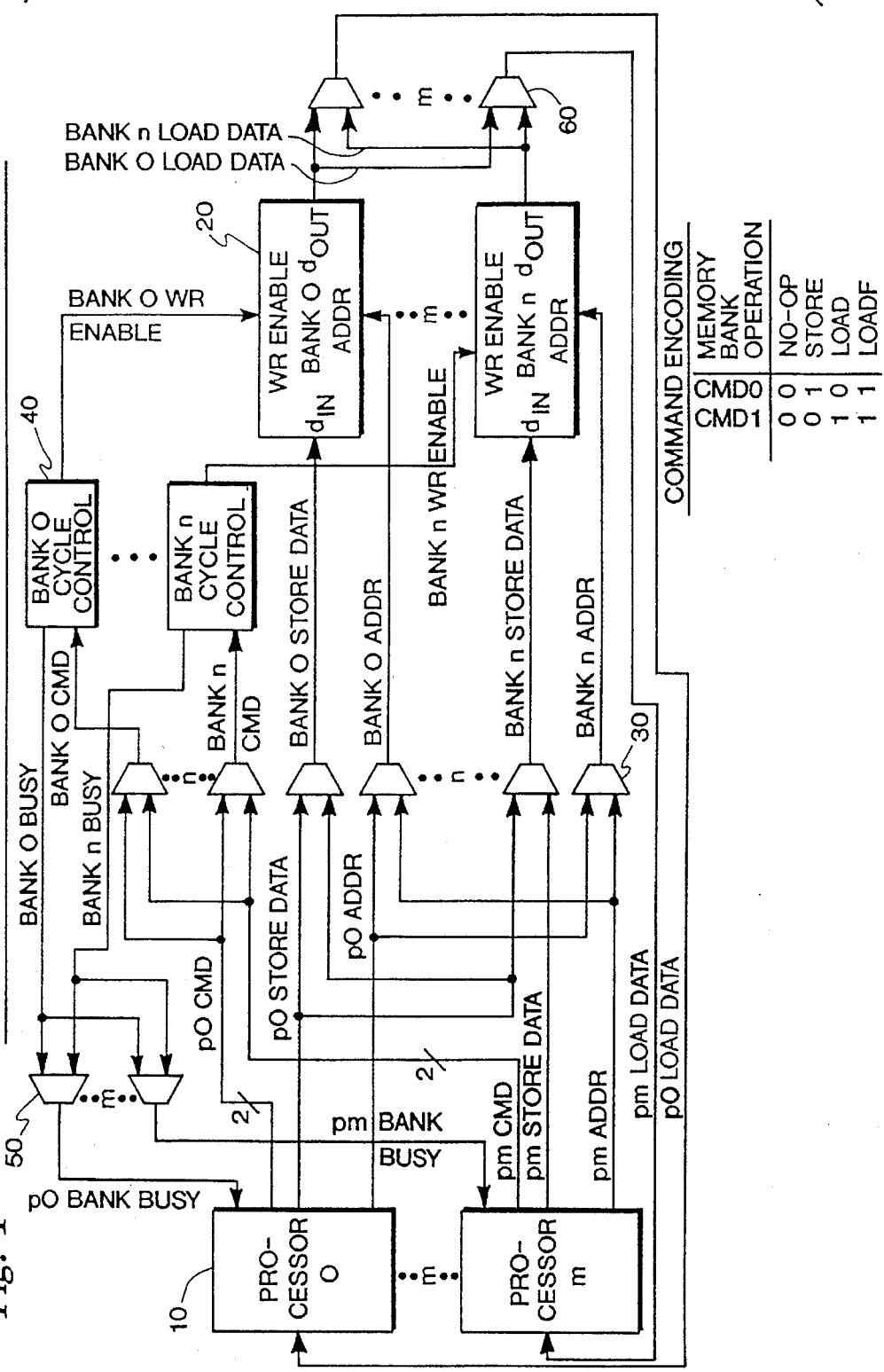
FIG. 1 is a block diagram of a multiprocessor memory system incorporating the load and flag instruction.

In the preferred embodiment, the load and flag instruction of the present invention is accomplished by issuing a load and flag command operation to a location in the main memory. Logic at the selected memory bank of the main memory interprets this command operation as a read of the data value in the memory location, followed by a write of a predefined flag value to the memory location. Because the address for the memory location is set up prior to the issue of the write of the predefined flag value, this logic can read the data currently at the memory location prior to issuing the write operation as part of a single atomic memory operation. The data value that is read is returned to the requestor using the normal read mechanisms.

Referring now to FIG. 1, one embodiment of the present invention will be described. FIG. 1 shows a multiprocessor memory system, having M processors 10 that may issue memory requests. For a more detailed description of the operation of the processors 10 of the preferred embodiment, reference is made to the previously identified co-pending application, entitled SCALAR/VECTOR PROCESSOR. Each of the processors 10 has a two-bit command that is part of a memory instruction which specifies the type of memory operation occurring: no-op, store to memory, load from memory, and load and flag. Although the embodiment shown in FIG. 1 will be described in terms of requests issued by a processor 10 to main memory, it will be understood that in the preferred embodiment, other requestors, such as an input/output controller may also make similar memory requests. It will also be understood that the multiple requestors need not be physically distinct, but may be multiple logical requestors from a single physical source, such as in time division multiplexing.

When a processor 10 has a request to memory, it generates a command, an address and store data to an arbitration network 30. The arbitration network 30 is used as a steering mechanism for the memory request. The arbitration network 30 for each memory bank 20 selects which processor 10 will have access to the bank 20. For a more detailed description of the operation of the arbitration network 30 of the preferred embodiment, reference is made to the previously identified parent application entitled CLUSTER ARCHITECTURE FOR A HIGHLY PARALLEL SCALAR/VECTOR MULTIPROCESSOR SYSTEM. Although the arbitration network 30 is described in terms of a switching mechanism, it will be understood that the present invention would also work with a system of multiplexers having any number of mechanisms for resolving conflicting requests, such as FIFO systems, revolving switches, etc.

Once the memory instruction is presented to the proper memory bank 20, a bank cycle control means 40 accepts the memory command inputs, decodes the memory command and starts an operation on the memory bank 20. The bank cycle control means 40 is used to keep track of the state of the memory bank 20 as the operation progresses. The bank cycle control means 40 also maintains a busy condition for the memory bank 20. In the embodiment shown in FIG. 1, a set of multiplexers 50 provide the processors 10 with a bank busy signal, thereby allowing the processors 10 to examine which memory banks 20 are busy and which are not. This mechanism 50 is strictly a hardware interlock means that is used to prevent the processors 10 from overrunning the bank cycle control 40.

For load and loadf operation, a switching mechanism 60 enables load data to be returned from the memory banks 20 to the processors 10. In the embodiment shown in FIG. 1, the switching mechanism 60 is implemented using a single multiplexer per processor 10 which selects data from the appropriate memory bank 20. For a detailed description of the preferred embodiment of the memory access system, reference is made to the previously identified co-pending application entitled, METHOD AND APPARATUS FOR NON-SEQUENTIAL RESOURCE ACCESS.

In the preferred embodiment, the predetermined flag value is loaded onto the store data lines for the appropriate memory bank 20 by using the switching mechanism 30. In response to the loadf instruction decode, the switching mechanism 30 selects a predetermined flag value stored in a memory or latch associated with the switching mechanism 30 and loads the predetermined flag value on the store data lines. In an alternate embodiment, the processor 10 could load a predetermined flag value onto the store data lines for the appropriate memory bank 20 in the same manner as performed by the switching mechanism.

In the preferred embodiment of the load and flag command, a floating point not-a-number (NAN) number is defined as the predefined flag value. The floating point NaN value chosen is a value that has the least possibility of interfering with useful data patterns. In the preferred embodiment, the value used for the flag value is hexadecimal (FFF4000000000000). When interpreted as a signed integer the value is a very large negative number, specifically, −3,377,699,720,527,872. When interpreted as an unsigned integer, the value is a very large positive number, specifically, 18,443,366,373,989,023,744.

Referring now to FIG. 2, the relative timing of the memory operations for the load, store, and load and flag commands of the present invention are shown. As shown, the load and flag command requires a slightly longer interval to complete than the load or store commands. In the preferred embodiment, the WR ENABLE signal is asserted by the bank cycle control means 40 a fixed amount of time after the start of the load and flag operation. This mount of time is the minimum amount necessary to ensure that the load data has been accessed from the memory bank 20 and captured by the switching mechanism 60.

The load and flag mechanism of the present invention is an atomic memory operation that simultaneously returns the current value of a memory location and stores a predefined pattern in its place. The preferred embodiment of the load and flag instruction in accordance with the present invention is set forth as the loadf instruction in Appendix A which is hereby incorporated by reference. The loadf instruction can be used as a method for synchronizing shared memory variables in a multiprocessor application.

In use, the loadf instruction operates somewhat like a self-setting semaphore register. When a first requestor uses the loadf instruction to retrieve a shared data item that is held in a given memory location, that requestor reads the value in the memory location and then locks the memory location by writing the preselected flag value in that location. In essence, this memory location is now checked out to the requestor who issued the loadf instruction. When other requestors attempt to access the data in this memory location, they are locked out from the memory location because they will retrieve the preselected flag value and not the data associated with that memory location. When the original requestor is finished with the data associated with the flagged location, a subsequent store is issued to the flagged location, loading the data back into the memory location, which also serves to "clear", i.e., unlock, the resource. It will be observed that in this embodiment of the present invention, each memory location is treated as an independent resource in that the memory location can be locked without affecting other memory locations.

It will also be observed that by using the loadf instruction, the original data value "stored" in the memory location is not actually present in the memory location for the duration of the flagged operation. During this time, the only copy of the data value is the copy in the processor or requestor that first retrieved the data using the loadf instruction. As the data value is generally updated or otherwise modified during the duration of the flagged operation, it will be recognized that the consequence of loss of significant data in the event of a system failure is negligible because the data is in the process of being updated.

The load and flag mechanism can also be used as a method of pipelining memory references with conflicts. This applies to both vector and parallel codes. The load and flag mechanism especially provides a solution to the problem of how to vectorize random access to memory while sustaining the memory pipeline. By providing the software running in a multiprocessor environment with a predefined flag value that indicates when a memory location is presently being used by another requestor, the load and flag mechanism supports distributed control over resource lockout. In this manner, the load and flag mechanism provides a powerful means for multithreading, vectorizing, and pipelining of traditionally scalar "Monte Carlo" applications. The term "Monte Carlo" refers to the random nature of the requested memory address stream created by these applications as they attempt to update various memory locations determined by pseudo-random techniques. In prior art, this random address stream prevented the use of pipelines, vectorization, and multithreading because address conflicts might occur. In this invention, the load and flag mechanism does not eliminate these conflicts, rather it supports pipelining of the detection and processing of these conflicts. Because the software running in a multiprocessor can detect when a resource conflict occurred, the hardware does not have to stop the pipeline in order to resolve these conflicts.

It should be noted that memory conflicts for a pipelined application, such as a Monte Carlo application, can occur when only a single processor is working on an application, as well as when multiple processors are working on the application. In the event that a single processor makes a second request to a memory location before it has restored a new data value and, thereby, reset the flag, the present invention operates as a self-checking resource lockout mechanism to prevent one part of the application from getting ahead of another part of the application.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. In a computer system a method of protecting data accessed by more than one requestor the method comprising the steps of:

(a) defining a set of data values and a set of lock values, wherein the sets of data values and lock values are mutually exclusive;

(b) reading a protected memory location, wherein the step of reading the protected memory location comprises atomically swapping a lock value selected from the set of lock values with information at the protected memory location;

(c) determining whether the information read from the protected memory location is within the set of data values; and (d) if the information read from the protected memory location is within the set of data values, then operating on the information to form a result, else repeating steps (b)–(d).

2. The method according to claim 1 wherein the method further comprises the step of:

(e) if the data read from the protected memory location is within the set of data values, then storing the result to the protected memory location.

3. The method according to claim 1 wherein the step (a) of defining a lock value comprises determining if the protected memory location has been designated as containing a floating point number and, if so, defining one of the set of lock values to a floating point not-a-number.

4. The method according to claim 1 wherein the step (a) of defining a lock value comprises defining one of the set of lock values to hexadecimal FFF4000000000000.

5. The method according to claim 1 wherein the step (d) of repeating comprises waiting a period of time before executing step (b).

6. A resource-lockout apparatus for a computer system having a shared memory, wherein a plurality of requestors may each request access to a selected memory location in the shared memory, and wherein a set of data values and a set of defined flag values are defined, wherein the set of data values and the set of defined flag values are mutually exclusive, the resource-lockout apparatus comprising:

(a) means for atomically swapping a lock value selected from the set of lock values with information at the protected memory location;

(b) means for determining whether the information read from the protected memory location is within the set of data values;

(c) means for operating on the information to form a result if the information read from the protected memory location is within the set of data values; and (d) means for transferring control to means (a) if the information read from the protected memory location is not within the set of data values.

7. The apparatus according to claim 6 wherein one of the set of lock values is a floating point not-a-number.

\* \* \* \* \*

UNITED STATES PATENT AND TRADEMARK OFFICE
CERTIFICATE OF CORRECTION

PATENT NO. : 5,499,356

DATED : March 12, 1996

INVENTOR(S) : Roger E. Eckert et al

It is certified that error appears in the above-identified patent and that said Letters Patent is hereby corrected as shown below:

Column 3, line 12, delete "(NAN)" and insert therefor --(NaN)--.

Column 6, line 49, after "system" insert --,--.

Column 6, line 50, after "requestor" insert --,--.

Column 5, line 13, delete "(NAN)" and insert therefor --(NaN)--.

Signed and Sealed this

Thirty-first Day of December, 1996

Attest:

BRUCE LEHMAN

Attesting Officer     Commissioner of Patents and Trademarks